(12) United States Patent
Kurapati

(10) Patent No.: US 7,698,693 B2
(45) Date of Patent: Apr. 13, 2010

(54) SYSTEM AND METHOD FOR RUN-TIME VALUE TRACKING DURING EXECUTION

(75) Inventor: Venkata Seshu Kumar Kurapati, Newbakaram Hyderabad (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1258 days.

(21) Appl. No.: 11/219,524

(22) Filed: Sep. 2, 2005

(65) Prior Publication Data

US 2006/0059470 A1 Mar. 16, 2006

(30) Foreign Application Priority Data

Sep. 2, 2004 (GB) ................. 0419440.3

(51) Int. Cl.
*G06F 9/44* (2006.01)
*G06F 9/30* (2006.01)

(52) U.S. Cl. .............. 717/131; 717/108; 717/116; 717/124; 712/216; 712/218; 712/228; 712/234

(58) Field of Classification Search ......... 717/108, 717/116, 124–162; 712/216, 218, 228, 234
See application file for complete search history.

(56) References Cited

U.S. PATENT DOCUMENTS

| | | | | |
|---|---|---|---|---|
| 5,678,032 A | * | 10/1997 | Woods et al. | ......... 703/26 |
| 6,694,427 B1 | | 2/2004 | Mericas et al. | |
| 2002/0074416 A1 | | 6/2002 | Van Rosmalen et al. | .... 235/493 |
| 2003/0061598 A1 | | 3/2003 | Karp et al. | |
| 2004/0215934 A1 | * | 10/2004 | Yoaz et al. | ......... 712/202 |

FOREIGN PATENT DOCUMENTS

| EP | 0 919 925 A2 | | 6/1999 |
|---|---|---|---|
| EP | 1 209 567 A1 | | 5/2002 |
| WO | PCT/US89/01393 | * | 10/1989 |
| WO | WO8909962 | | 10/1989 |

OTHER PUBLICATIONS

Jaramillo et al., Verifying Optimizers through Comparison Checking; Obtained from www.cs.virginia.edu/~soffa/research/Comp/cocv.paper.pdf ; 2001, pp. 1-16.*
European Search Report For European Application No. EP05108039, mailed Mar. 19, 2008 (11 pages).

* cited by examiner

*Primary Examiner*—Wei Y Zhen
*Assistant Examiner*—Satish Rampuria

(57) ABSTRACT

A technique for run-time tracking changes to variables and memory locations during code execution to increase efficiency of execution of the code and to facilitate in debugging the code. In one example embodiment, this is achieved by determining whether a received instruction in a trackable instruction during code execution. The trackable instructions can include one or more trackable variables. The trackable instruction is then decoded and a track instruction cache and a track variable cache are then updated with associated decoded trackable instruction and the one or more trackable variables, respectively.

22 Claims, 5 Drawing Sheets

SYSTEM AND METHOD FOR RUN-TIME VALUE TRACKING DURING EXECUTION

TECHNICAL FIELD OF THE INVENTION

The present invention relates generally to processor architectures and instruction sets and more particularly relates to processor architectures with instruction sets that track variables and memory locations.

BACKGROUND OF THE INVENTION

A known factor influencing the decoding of generated code is the execution of unnecessary instructions, which do not alter the outcome of a program. These instructions occur during operations, such as range check, value reuse, and finding maximum or minimum value in an array, and the like. Generally, it is difficult to detect these unnecessary instructions during the compiling process as they occur only during code execution. These instructions can have a significant impact on the computation subsystem, as well as the memory subsystem performance.

One conventional method for achieving optimization in such conditions is to receive source code and to compile it in a manner that provides an efficient object code. Other conventional methods employ techniques, such as value reuse, range check elimination, dead code elimination, background trackable instructions, and loop transformations to optimize the code, which reduces execution of unnecessary instructions, and so on. However, these techniques do not perform run-time tracking of changes to variables, expressions, and/or memory locations and therefore are not suitable for detecting the unnecessary instructions that can occur during code execution.

Furthermore, the conventional techniques only track changes to either variables or memory locations but not both. Therefore, there is a need to track changes to variables and memory locations during code execution to achieve a better optimization by the processor, to reduce the execution of these unnecessary instructions and can further aid in debugging code.

SUMMARY OF THE INVENTION

According to a first aspect of the invention there is provided a method for run-time tracking of a variable during code execution, the method comprising the steps of:
  a) determining during the code execution that an instruction received is a trackable instruction, wherein the trackable instruction has one or more trackable variables;
  b) if so, decoding the trackable instruction; and
  c) updating a track instruction cache and a track variable cache with associated decoded trackable instruction and the one or more trackable variables, respectively.

Preferably, the instruction is decoded as a normal instruction, if the received instruction is not a trackable instruction. Preferably, the method includes the step of determining whether the instruction is a background trackable instruction or foreground trackable instruction. Preferably, the background trackable instruction is decoded and the track instruction cache and the track variable cache is updated with the associated decoded background trackable instruction and the one or more trackable variables, respectively. Preferably, the method includes the step of determining a status of each track variable flag bit associated with the one or more trackable variables in the foreground trackable instruction and decoding the foreground trackable instruction based on the status of each track variable flag bit associated with the one or more trackable variables in the foreground trackable instruction.

According to a second aspect of the invention, there is provided an article including a storage medium having instructions that, when decoded by a computing platform, result in execution of a method for run-time tracking of a variable during code execution, the method comprising the steps of:
  a) determining during the code execution that an instruction received is a trackable instruction, wherein the trackable instruction has one or more trackable variables;
  b) if so, decoding the trackable instruction; and
  c) updating a track instruction cache and a track variable cache with associated decoded trackable instruction and the one or more trackable variables, respectively.

According to a third aspect of the invention, there is provided system for run-time tracking of a variable during code execution, the system comprising:
  a) a processor; and
  b) a memory coupled to the processor, the memory having stored therein code which when decoded by the processor, the code causes the processor to perform a method comprising:
    1) determining during code execution that an instruction received is a trackable instruction, wherein the trackable instruction has one or more trackable variables;
    2) if so, decoding the trackable instruction; and
    3) updating a track instruction cache and a track variable cache with associated decoded trackable instruction and the one or more trackable variables, respectively.

BRIEF DESCRIPTION OF THE DRAWINGS

Embodiments of the invention will now be described, by way of example only, with reference to the accompanying drawings in which.

DETAILED DESCRIPTION OF THE INVENTION

In the following detailed description of the various embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

The term code means a file containing an executable computer program. Further, the term "execution" means a process by which a computer carries out the instructions of the executable computer program. The term "fetch" refers to getting an instruction from memory. The term "tracking" refers to tracking changes to one or more variables and memory locations during a code execution, which can be later used for on the fly computations to reduce the execution of unnecessary instructions, to aid in debugging a code, to reduce load on the memory system, to generate history of what is happening during code execution, and so on.

The terms "code" and "program" are used interchangeably throughout the document. Further, the term "normal instruction" refers to an instruction that is not the run-time trackable instruction of the present invention.

Figure 1:
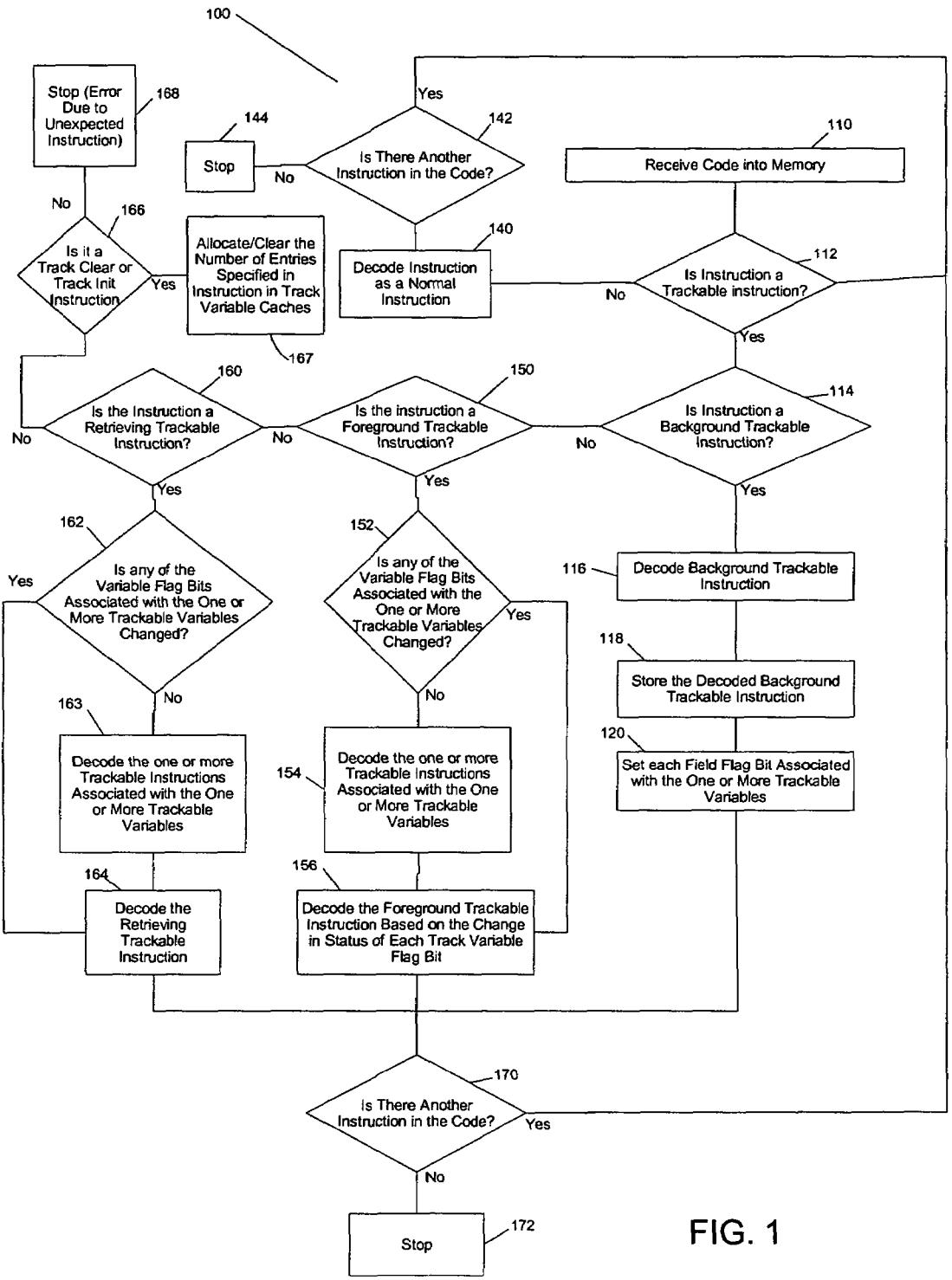
FIG. 1 is a flowchart illustrating an example method of performing run-time variable tracking according to an embodiment of the present invention.

FIG. 1 illustrates an example method 100 of run-time tracking of one or more variables during code execution in a computer. At 110, this example method 100 receives code from main memory for execution. The code can include one or more instructions in the executable computer program. In these embodiments, the one or more instructions can include normal instructions, trackable instructions, retrieving trackable instructions, and/or memory trackable instructions. The trackable instructions can include tracking instructions and init/clear instructions. The trackable instructions can be either a foreground trackable instruction or a background trackable instruction. In these embodiments, an execution unit of a processor receives the one or more instructions sequentially for execution by a processor.

At 112, the method 100 checks whether an instruction received from the main memory is a trackable instruction during code execution. In these embodiments, the trackable instructions include one or more trackable variables. The trackable instructions can be used to define trackable variables, retrieve values from a track table and set predicates, and transfer control based on the track predicates or the track table values.

In these embodiments, each of the above type of trackable instructions either defines or uses a trackable variable. Each of the trackable instructions can include instruction hints associated with them for retrieving trackable variables. Also in some embodiments, the trackable instructions can define track predicates. The instruction hints can specify the type of operation it performs and whether they need to be decoded in the background or foreground. In addition, the hints can include whether or not the instruction generates any predicate.

The following are some example formats that can be used for the variable trackable instructions:

inst.inshints, [track table information], (track variable), expr.

inst.inshints, (track variable), expr, prediate1, (predicate2)/label (optional).

inst.inshints, (track variable), variable 1, (variable 2, variable 3), variable 4, predicate, predicate/label (optional).

The following are some example formats for array tracking instructions for variables:

inst_a.inshints, [track table information], (track variable), beg, end, array element size, index variable, operation inst_a.inshints, (track variable), index, expr, predicate, (predicate)/label (optional)

inst_a.inshints, (track variable), variable 1, (variable 2, variable 3), variable 4/register, predicate 1, (predicate 2)/label (optional)

The above illustrated array instructions are different from the variable trackable instructions because the portion of the array or memory region being tracked needs to be known.

The following illustrates some example instructions that can be used to create and remove track variables from a track value cache, which can be either a track variable cache or a track memory cache.

track.init, [b\n\a\m, size, replacement], (track variable), expr track_a.init, [b\n\a\m, size, replacement] (track variable), beg, end, array element size, expr track.clear track variable The first instruction is used to create a normal trackable variable to form a storage space for holding the value of a track variable generated during subsequent operations on the track variable. Wherein b\n\a\m represents a type of track variable, b indicates a binary type, n indicates whether a track variable is a real number, a indicates an array of real numbers, which is mainly used for value reuse for an expression in the instruction, and m represents a memory track variable.

Replacement bits in the above instruction are used for replacing the values in the track variable cache in case there is any scarcity in the available memory space. The replacement bits are used only for value reuse purposes. When using the replacement bits for value reuse purposes the size field in the above instruction indicates a history table size. If the history table contains entries for the track variable, the replacement of the track variable will be done using a replacement policy specified in a replacement field. Replacement can be done using a round robin technique.

The second instruction above is used for creating a trackable variable for arrays. The fields beg and end indicates the beginning and end of the array variable, respectively, that is being tracked. The field size indicates the size of the array element. The third instruction is used to clear the track variable and this instruction releases the resources associated with the track variable in the track variable cache. The size field indicates the number of entries for value reuse of the normal instruction. The field expr is used to initialize the track variable. The first element in array track variables can be initialized either by using the field expr or zeros.

The following illustrates some example operations that can be performed using the above illustrated trackable variable and array instructions:

1) track.inshints, (track variable), expr, predicate 1, (predicate 2). track.inshints (track variable), variable 1, (variable 2, variable 3), variable 4, predicate 1, (predicate 2).

Using the above trackable instructions, compiler can interact with the hardware to track the expression based on the track variable field in the instruction if the predicate is set to be true, otherwise the instruction is not executed. The tracking predicates are similar to normal predicates, except that they are computed from the trackable instructions and track variables. The second type of instruction is used for value reuse operations. The (predicate 2) field in the above instructions indicates that the predicate is defined by the instruction when the expr is true or valid. The predicate without the brackets, i.e., predicate 1, indicates the use of the predicate.

2) track.inshints, (track variable), expr, read/write, (preidcate)/predicate, predicate.

Using this above trackable instruction, the variable accesses can be tracked, which can later be used for determining either the side effects of a call or whether any variable escapes the scope of the function. It is sufficient to have the size of the track results to be one bit to know whether the variable has been read or written during the code execution can be. The size of track results can be more than one bit when tracking changes in a variable memory location. They are used for memory tracking of an address of a variable or an address the field expr computes.

3) track_a.inshints, (track variable), index, expr, predicate 1 (predicate 2).

This instruction is similar to the above trackable instruction (1), except that this one handles array elements. The index information is used for computing the value associated with the index inside an array variable. This will enable using a single track variable instead of many track variables for each element in an array. In these cases, the boundaries of the array variables have to be indicated while creating the track variable.

4) track_a.inshints, (track variable), index, read/write, predicate 1, (predicate 2).

Again, this instruction is similar to the above trackable instruction (2), except that it handles array elements. Index information is used to retrieve the value of tracked information.

Wherein Inshints=fin\bg\fg, expr=variable operator variable|variable\register\read\write, operator=relop\arith\map, relop=>=|<=|>|<|==, map="=", arith=+|−|%|/|*. The map operator is used for value reuse operations.

The following are some example formats that can be used for retrieving trackable instructions for variables according to the present invention:

retr.inshints, (track variable), variable/register, label/predicate retr_a.inshints, (track variable), index, variable/register, label/predicate Using the above instructions, the tracked values can be retrieved and they can either perform run-time optimizations using the predicate or perform control transfers. The retrieved information can also be used for handling exceptions during the tracking. In some embodiments, the tracked information is retrieved based on a lookup operation. The lookup operation can be performed using an expression and can be used for value reuse operations.

The above instructions are used for retrieving tracked information either for computations or making the information as a predicate. Later, these tracked predicate variables can be used either to eliminate the dead code or the redundant computations during code execution. As described earlier, the retrieving trackable instructions can be used to perform the control transfer.

The following are example formats for array retrieving trackable instructions for variables according to the present invention:

retr.inshints, (track variable), variable 1, (variable 2, variable 3) variable 4/register, label/predicate.

retr_a.inshints, (track variable), variable, index, variable/register, label/predicate.

The above two instructions are used for performing value reuse optimizations as well as for array variable tracking. The first instruction performs a value reuse lookup when the lookup is based on the variable 1, (2, 3) and the output is stored into the field variable 4 or register. This instruction will set the predicate true if the lookup is successful, otherwise it will set the predicate false. The second instruction is used for retrieving the tracking information related to array variables. The field index is used to retrieve the tracked information associated with the array variable index.

The hints in the retrieval instructions can be as follows: inshints=\fin\bg\fg

Based on the determination at 112, if the instruction is not a trackable instruction, then the method goes to 140 and decodes the instruction as a normal instruction. At 142, the method checks whether there is another instruction in the code that needs to be decoded based on the program counter register. Based on the determination at 142, the method 100 goes to step 112 and repeats the steps 112-172, if there is another instruction in the code that needs to be decoded. Based on the determination at 142, the method 100 goes to step 144 and stops the execution of the code, if there are no other instructions in the code that need to be decoded.

Based on the determination at 112, if the instruction is a trackable instruction, then the method goes to 114. At 114, the method 100 checks whether the trackable instruction is a background trackable instruction. Based on the determination at 114, the method goes to step 116, if the trackable instruction is a background trackable instruction.

At 116, the background trackable instruction including the one or more trackable variables is then decoded. At 118, the method 100 stores the decoded background trackable instruction in a track instruction cache, which can be later executed when the processor finds an empty slot or free resources. At 120, for each track variable defined by the background trackable instruction, a corresponding instruction number in the tracking variable cache is placed for the field last instruction number and a flag bit corresponding to each track variable is set to be true.

Based on the determination at 114, the method 100 goes to step 150, if the trackable instruction is not a background trackable instruction. At 150, the method checks whether the trackable instruction is a foreground trackable instruction. Based on the determination at 150, the method 100 goes to step 152, if the trackable instruction is a foreground trackable instruction. At 152, the method 100 determines whether the status of any of any of the variable flag bits associated with the one or more trackable variables in the foreground trackable instruction have changed.

Based on the determination at 152, the method 100 goes to step 154 if the foreground trackable instruction is decoded as a normal instruction whereby the track variable flag bit associated with the one or more variables in the foreground trackable instruction does not indicate a change in the status, i.e., the flag bit is set to be false. At 154, the method 100 decodes one or more trackable instructions from the track instruction cache corresponding to the track variables associated with the foreground trackable instruction based on the track variable cache filed last instruction number field associated with the track variables. Further, the track variable flag bit field for the track variable that is being defined by the instruction after decoding of the instruction is cleared. This process is repeated until all the track variables that are required by the current foreground trackable instruction are defined and the associated flag bit is set to be false.

At 156, the foreground trackable instruction is decoded based on the change in status of each track variable flag bit associated with the one or more trackable variables in the foreground trackable instruction. Based on the determination at 152, the method 100 goes to step 156 if the track variable bit associated with each of the one or more track variables in the foreground trackable instruction indicates a change in the status, i.e., the filed flag bit is set to be true.

Based on the determination at 150, the method 100 goes to goes to step 160 if the trackable instruction is not a foreground trackable instruction. At 160, the method 100 determines whether the instruction is a retrieving trackable instruction.

Based on the determination at 160, the method 100 goes to step 162, if the received instruction is a retrieving trackable instruction. At 162, the method 100 determines whether the status of any variable flag bits associated with the one or more trackable variables have changed.

Based on the determination at 162, the method 100 goes to step 163 if the retrieving trackable instruction is decoded as a normal instruction whereby one or more of the variable flag bits associated with the one or more track variables in the retrieving trackable instruction is set to be false. At 163, one or more trackable instructions are decoded from the track instruction cache corresponding to the track variables associated with the retrieving trackable instruction, based on the track variable cache filed last instruction number field associated with the track variables. Further, the track variable flag bit field for the track variable that is being defined by the instruction is cleared after decoding the retrieving trackable instruction. The above process is repeated until all the track variables that are required by the current retrieving trackable instruction are defined and the associated flag bits are set to be false. At 164, the retrieving trackable instruction is decoded using the retrieved one or more trackable variables. Based on the determination at 162, the method goes to step 164 if the one or more of the variable flag bits associated with the one or more track variables in the retrieving trackable instruction is set to be true.

At 170, the method 100 determines whether there is another instruction in the code that needs to be decoded based on the program counter (PC). Based on the determination at 170, the method 100 goes to step 112 and repeats steps 112-172 if there is another instruction that needs to be decoded. Based on the determination at 170, if there are no other instructions to be decoded, then the method 100 goes to step 172 and stops the execution of the received code.

Based on the determination at 160, the method 100 goes to 166 if the received instruction is not a retrieving trackable instruction. At 166, the method determines whether the received instruction is a track clear instruction or a track unit instruction. The track clear instruction releases the track variable entry from the track variable cache or from the track memory cache. Based on the determination at 166, the method 100 goes to step 168 if the received instruction is not a track clear or track unit instruction. At 168, further code execution is stopped. This can happen due to an unexpected error in the received instruction. Based on the determination at 166, the method 100 goes to 167 if the received instruction is a track init instruction or track clear instruction. At 167, the number of track variable entries specified in the track clear instruction is allocated/cleared in associated track value caches.

The following example C program illustrates some trackable instructions that can be inserted into a code to track variables during the code execution:

```
for(i=0;i<100;i++)
{
  for(j=0;j<1000;j++)
  {
    a[j]=... <------ T1
    ... ... ... ... ... ... ... ...
    if(j==0)
      winner=b[j] <----- T2
    else
      if(b[j]>winner)
        winner=b[j]; <------ T3 (O1)
  }
```

-continued

```
  ... ... ... ... ... ... ... ...
  ... ... ... ... ... ... ... ...
  for(j=0;j<1000;j++){
    if(a[i]>theta){ <------ (1) (O2)
      c=a[I]*2;
    ... ... ... ... ... ... ... ...
    ... ... ... ... ... ... ... ...
    }else{
      =sqrt(a[i]) <------ (2) and T5 (O4)
    }
  }
  ... ... ... ... ... ... ... ...
  ... ... ... ... ... ... ... ...
  for(j=0;j<1000;j++){
    if(...)
      b[j]=... <----- T4
  }
  ... ... ... ... ... ... ... ...
  for(j=0;j<1000;j++){ (3)
    if(j==0)
      winner=b[j]
    else
      if(b[j]>winner)
        winner=b[j];
  }
  ... ... ... ... ... ... ... ... (4)
}
```

In the above example C program, the trackable instructions are inserted at locations T1, T2, T3, T4, and T5. Each tracking instructions inserted at these locations T1, T2, T3, T4, and T5 track either simple variables or expressions containing multiple variables. For example, tracking instruction inserted at location T1 tracks the variable a [j]. Similarly, trackable instructions at locations T2, T3, and T4 all track the same variable winner but not the variable b [j]. In the above example C program, the locations labeled (1), (2), and (3) use the tracking information obtained by trackable instructions inserted at locations T1, T2, T3, and T4 to perform the following operations.

The operation at location (1) can remove unnecessary loads by placing the tracked information computed by trackable instruction at location T1, which is "if (a [j]>theta)" in a bit vector or part of hardware cache by loading only the variable a [j] at location (1) if the bit is not set for the induction variable in the tracking operation.

The operation at location (2) uses the tracking information (a [j], sqrt (a [j]) for value reuse to avoid re-computation of sqrt (a [j]), thus can remove the redundant evaluation of the computations for the same input. Since the operation at location (2) is a value reuse operation, a track variable T5 is defined to lookup history.

The operation at location (3) does not decode the "for" loop again to compute the value for variable winner since we have already tracked variable winner earlier at trackable instruction T4.

The tracking technique described above can be used for dynamic optimizations, reducing traffic to/from a memory system (as memory access can be slower than operation performed by a processor), debugging code, and valuing reuse operations, such as those shown in our running example C program, O1, O2, O3, and O4, respectively.

The following example operations further illustrate, using the software/hardware approach, as to how tracked variables during code execution can be used in run-time optimizations O1, reduce traffic to and from a memory system O2 (memory access is generally slow when compared with using a processor for load-to-use operations), debugging the code O3, and in value reuse O4.

For performing operation O1, the compiler generates tracking hints to the hardware, so that the processor can compute some of the tracking computations in the background, which can reduce any unnecessary instructions in code. Such operations can improve instruction level parallelism in a program.

The operation O1 is illustrated using our running example C program. In this example, the compiler tracks definition of variable b [ ] by including the following instructions to the hardware.

track.init [n] (t4), winner - - - (i0)
track.bg b[j]>(t4), (bt4); - - - (i1)
track.bg (t4), b[j], b[t4 ]; - - - (i2)

The instruction (i0) initializes the value of trackable variable (t4) to the value of variable winner. The instruction (i1) informs that the hardware needs to track the expression "b[ji]> winner" at location (1), if the expression is true, the instruction sets the predicate bt4. The instruction (i2) then updates the track variable t4 with a value of b[j] if the predicate bt4 is set to be true in the previous instruction. Using the above three trackable instructions (i0), (i1), and (i2), the value for max(b[0], . . . , b[n]) can be obtained. The instruction completed in the above example is .bg, which instructs that the architecture can decode these trackable instructions (i1), and (i2), only if it finds an instruction "nop", instruction bundle, or decodes the trackable instructions (i0), (i1), and (i2) in case of either the memory pipeline stalls or the computation pipeline stalls or in case the value is needed by foreground or retrieving trackable instructions.

In our above running example C program, the compiler generates an instruction to perform on-the-fly redundant computations performed at the beginning of location (3). It is possible this might have been already computed when performing the operation for max(b[0], . . . , b[n]). Therefore, to avoid redundant computations of the same value, the compiler can generate the following instruction just before location (3) in our above running example C program.

reter.fin, (t4), winner, (4) - - - T6

The above instruction at location T6 computes any pending instructions if the .bg instructions that are placed in the trackable instruction at location T4 are not yet completed. After the execution of the pending instructions, the program copies the result value for the trackable variable (t4) to program variable winner and the control is transferred, after computing the value of variable winner, to location (4) shown in our running example C program.

For performing operation O2, loads that can be removed from the program are determined to reduce the D-Cache misses, thus we can improve the data cache locality and reduce the load on memory subsystems. This is illustrated using our running example C program as follows:

The variable a [j] is tracked by the trackable instruction placed at the location T1. This tracking operation removes unnecessary loads of variable a[j] in the subsequence operation at O2 in the program. This operation can be performed using the following example instructions:

track_a.init [a] (t1), a[0], a[n], 4, j, a[0]
track_a.bg, j, a[j]>theta, bt1 track_a.bg, j, bt1, bt1
track_a.bg, j, bt1, bt1

In the above example instruction, the hardware decodes the instruction in the background and keeps the information in a track variable cache associated with the variable t1 and the value will be stored at location t1+index with index as a trackable variable (t1). At location (1), in our running example C program, the trackable instruction does not need to load variable a[j], but instead can use the tracked values from the track variable cache corresponding to track variable t1 to avoid a load operation a[j] to reduce the load on the memory subsystem. This can also improve data locality as a result of not bringing the variable a[j]. Also, this can improve ILP at the program point of trackable instruction T1 due to availability of additional instructions to compute. To retrieve a value from the tracking, the instructions in the "if" block at location (1) will have to be decoded on the tracking predicate, which are set by the retrieval instructions. The tracking predicate does not execute "if" condition at the location (1) if it set to true. For our example, the code at location (1) in the above C program, after using tracking predicate can be as follows:

retr_a.fin, (t1), j, t1==0, tp1.

The above instruction defines a tracking predicate tp1 using the information with the track variable (t1) at the index j. Now, to decode the instructions that are present in the "if" block, compiler generates the instructions to use the track predicate tp1. In our running example C program, the trackable instruction can be as follows:

tp1: c=a[j]+2

The above trackable instruction can be used at location (3) in our running example C program to debug the program, i.e., to find any design constraints used in the program.

At locations (4) and (5), the memory is freed up for the variable a. In case the memory is freed up again, tracking such information can be helpful for debugging the program. This can be performed by tracking the variable a address indicating that the memory tracking can be performed The space required for a logical address can be large in a computer and therefore it would be difficult to keep all the entries in memory track tables. So, to track a chunk of memory, different sizes of memory track variables, whose size can be a power of two, is provided. The size field in the memory tracking instruction can determine the memory track variable cache size and the corresponding memory track cache. The tracked information on the address of the variable a can be used to aid in the debugging of the program.

The following operation O4 illustrates the value reuse by retrieving the tracked information. In our running example C program, the value reuse can be performed at location (2) in the program as follows:

track.init [a,10,lru] (t5), 0,0 retr.fg (t5), a[j], r30, pt5
if !pt5
r30=sqrt(a[j])
track.bg (t5), a[j],r30

The second instruction above performs value reuse operation for the function sqrt with variable a[j] as input and r30 as an output register. The instruction retrieves the value from the trackable variable t5 with hash table index as a[j]. If there is any entry in the track variable cache table the resulting value associated with it is moved to the register r30 and also the instruction sets the track predicate pt5 to be true. If there is no entry in the track variable cache table associated with trackable variable t5, then the instruction will set the track predicate to be false. The function sqrt is decoded if the track predicate pt5 is false. If the track predicate pt5 is true, then the function sqrt is not decoded. If the track predicate pt5 is false, then the function sqrt is decoded. After decoding the sqrt function each time, the track table associated with the trackable variable t5 is updated, which is performed by the last instruction in the above example program. The operation O4 defines the trackable variable t5 and updates the track variable cache associated with the track variable t5. The replacement policy for the track variable t5 is the least recently used policy. The track variable cache contains nearly ten entries and each entry contains two variables. The first variable is the table index which is a[j], in such a case the second variable is the result or mapping for the variable a[j] which is register r30.

Figure 2:
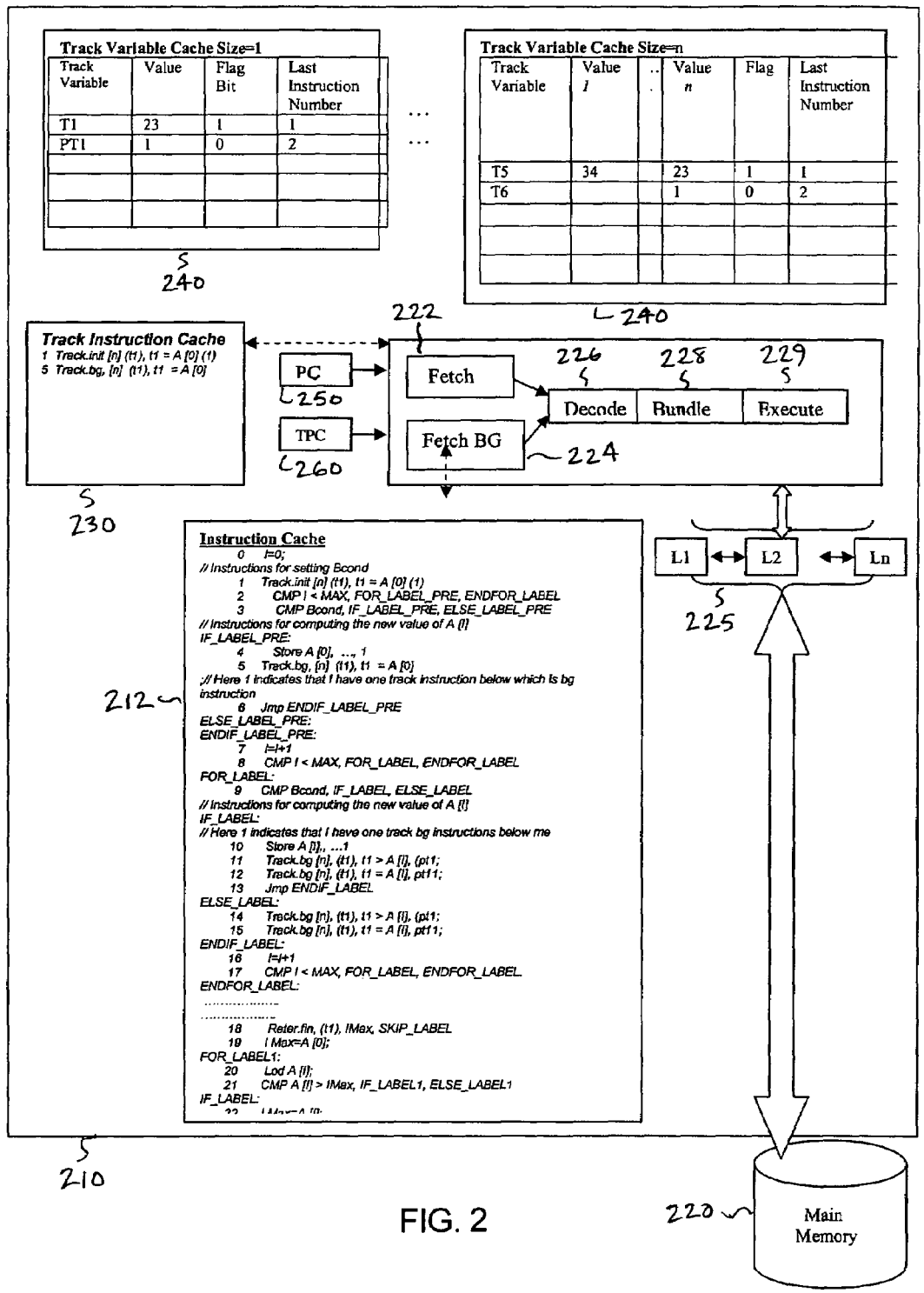
FIG. 2 is a block diagram illustrating an example computer system to implement the method for performing the run-time variable tracking of FIG. 1.

The following example code along with the block diagram in FIG. 2 further illustrate the variable tracking technique described above with reference to FIG. 1.

The following example source code is used to demonstrate the variable tracking technique of the present invention:

```
For (I=0;I<MAX;I++){
    Bcond:=.. ; // Compute the Boolean condition.
    If (Bcond){
        A [I]: =.. ; // Assigned with some new value.    ---------T1
    }
}.    ---------F1
......................
......................
IMax=A [0];
For (I=1;I<MAX;I++){
    If (A [I]>IMax){
        IMax=A [I];
    }
}.    ---------F2
```

The above example source code shows the locations T1, F1, and F2 in the code where tracking instructions could be inserted to track variables during code execution.

After compiling the above example source code, the assembly code will be as follows:

```
I=0;
// Instructions for setting Bcond
CMP I < MAX, FOR__LABEL__PRE, ENDFOR__LABEL
CMP Bcond, IF__LABEL__PRE, ELSE__LABEL__PRE
// Instructions for computing the new value of A [I]
IF__LABEL__PRE: Store A [0], ...
Jmp ENDIF__LABEL__PRE
ELSE__LABEL__PRE:
ENDIF__LABEL__PRE:
I=I+1
CMP I < MAX, FOR__LABEL, ENDFOR__LABEL
FOR__LABEL:
CMP Bcond, IF__LABEL, ELSE__LABEL
// Instructions for computing the new value of A [I]
IF__LABEL:
Store A [I], ...
Track.bg (t1), t1 = A [I], pt1
Jmp ENDIF__LABEL
ELSE__LABEL:
Track.bg (t1), t1 > A [I], (pt1)
Track.bg (t1), t1 = A [I], pt1
ENDIF__LABEL:
                I=I+1
CMP I < MAX, FOR__LABEL, ENDFOR__LABEL.
ENDFOR__LABEL:
..................
..................
IMax=A [0];
CMP I < MAX, FOR__LABEL1, ENDFOR__LABEL1
FOR__LABEL1:
Lod A [I];
CMP A [I] > IMax, IF__LABEL1, ELSE__LABEL1
IF__LABEL:
IMax=A [I];
Jmp ENDIF__LABEL1
ELSE__LABEL1:
ENDIF__LABEL1:
I=I+1
CMP I < MAX, FOR__LABEL1, ENDFOR__LABEL1.
ENDFOR__LABEL1:
```

After compiling the above example source code, the assembly code including the variable tracking instructions will be as follows:

```
I=0;
Track.init [n] (t1), t1 = A [0]
// Instructions for setting Bcond
CMP I < MAX, FOR__LABEL__PRE, ENDFOR__LABEL
CMP Bcond IF__LABEL__PRE, ELSE__LABEL__PRE
// Instructions for computing the new value of A [I]
IF__LABEL__PRE:
Store A [0], Track.bg (t1), = A [0]
Jmp ENDIF__LABEL__PRE
ELSE__LABEL__PRE:
ENDIF__LABEL__PRE:
I=I+1
CMP I < MAX, FOR__LABEL, ENDFOR__LABEL
FOR__LABEL:
CMP Bcond, IF__LABEL, ELSE__LABEL
// Instructions for computing the new value of A [I]
IF__LABEL:
Store A [I],, ...
Track.bg (t1), t1 > A [I], (pt1)
Track.bg (t1), t1 = A [I], pt1 Jmp ENDIF__LABEL
ELSE__LABEL:ENDIF__LABEL:
I=I+1
CMP I < MAX, FOR__LABEL, ENDFOR__LABEL.
ENDFOR__LABEL:
..................
..................
Reter.fin, (t1), IMax, SKIP__LABEL
IMax=A [0];
CMP I < MAX, FOR__LABEL1, ENDFOR__LABEL1.
FOR__LABEL1:
Lod A [I];
CMP A [I] > IMax, IF__LABEL1, ELSE__LABEL1
IF__LABEL:
IMax=A [I];
Jmp ENDIF__LABEL1
ELSE__LABEL1:
ENDIF__LABEL1:
I=I+1
CMP I < MAX, FOR__LABEL1, ENDFOR__LABEL1.
ENDFOR__LABEL1:
SKIP__LABEL
```

Referring now to FIG. 2, there is illustrated a block diagram of an example computer system 200 for implementing the method for performing the run-time variable tracking of FIG. 1. The computer system 200 includes a processor 210 and a main memory 220. As shown in FIG. 2, the processor 210 includes a track instruction cache 230, track variable caches along with associated track variable flag bits 240, and memory caches L1, L2 ... Ln 225, an instruction cache 212 to store the source code including normal and trackable instructions, a fetch unit 222, a fetch BG unit 224, a decode unit 226, a bundle module 228, and a decode module 229. The fetch BG unit 224 gets an instruction from the track instruction cache 230. Also shown in FIG. 2, are a program counter (PC) module 250 and a track instruction program counter (TPC) module 260.

The bundle module 228 bundles the normal instructions with the tracking instructions stored in track instruction cache, whenever the bundle module 228 finds a free slot in an instruction in the program, a stall in the pipeline, and/or when only the background trackable instructions have to be executed, In such a case, the bundle module 228 bundles the individual instructions, which are present in the track instruction cache 230. The fetch BG unit brings the trackable instructions, instead of the normal instruction cache during decoding from the track instruction cache 230.

In operation, the source code including the normal and trackable instructions (shown above) stored in the instruction cache 212, which is obtained from main memory 220, is fed sequentially into the processor 210 for decoding the code. During the decoding of the source code, the computer system 200 uses the track instruction cache 230 along with the track variable caches 240 to track the trackable variables according to the present invention.

Assigning values to variable Max=10 and array A={0,23, 12,21,22,11,11,22,3,2}, the following illustrates how the variable tracking instructions function.

During execution of the above source code including the normal and the trackable instructions, the value of array A changes to={0,2,14,21,22,11,13,23,3,2}; at location F1 in the program. Initially, all the source code instructions including the tracking instructions are loaded from the main memory 220 into the instruction cache 212. The fetch unit 222 and the fetch BG unit 224 of the processor 210 then obtains the source code including the normal and the trackable instructions from the instruction cache 212 and inputs it sequentially into the processor 210. The decode unit 226 then receives each instruction and processes it as a normal instruction if the instruction is a normal instruction. Otherwise, the decode unit 226 will replace the run-time variables with the constants and place the final instruction into the track instruction cache 230 if the received instruction is a background trackable instruction.

The decode unit 226 will decode all the instructions that are placed in the track instruction cache 230 that are relevant to the execution if the received instruction is a foreground trackable instruction. While performing the above operation, the decode unit 226 does not decode the instructions from the normal program instruction stream (not based on program counter). However, it will decode the instructions in the track instruction cache 230 up to a last instruction that contains the track variable for which the foreground trackable instruction could be waiting. This can be achieved by storing the last instruction number for each track variable in which it is being defined. The required track variables can be obtained by decoding the instruction whose number is equal to the last instruction number field in the track variable cache associated with the track variable. The tracking starts at trackable variable t1 with 0 (which is A [0]). This can be accomplished by referencing in the first comment in the source code.

The trackable instructions are decoded as follows:

| Tracking Instruction | Result |
|---|---|
| 14 Track.bg [n], (t1), t1 > A I1], (pt1) | Pt1 (true) |
| 15 Track.bg [n], (t1), t1 = A [1], pt1, 1; | T1 (2) |
| 11 Track.bg [n], (t1), t1 > A I2], (pt1) | Pt1 (true) |
| 12 Track.bg [n], (t1), t1 = A [2], pt1, 1; | T1 (14) |
| 11 Track.bg [n], (t1), t1 > A I3], (pt1) | Pt1 (true) |
| 12 Track.bg [n], (t1), t1 = A [3], pt1, 1; | T1 (21) |
| 14 Track.bg [n], (t1), t1 > A I4], (pt1) | Pt1 (true) |
| 15 Track.bg [n], (t1), t1 = A [4], pt1, 1; | T1 (22) |
| 14 Track.bg [n], (t1), t1 > A I5], (pt1) | Pt1 (false) |
| 15 Track.bg [n], (t1), t1 = A [5], pt1, 1; | T1 (22) |
| . | |
| . | |
| . | |

The final value of trackable variable t1 at the end of first for loop will be 23. It can be seen from the above table that the order of storing the trackable instructions can be important since there may be several track instructions that may be defining the same resource by consuming several other resources, which can be defined by instructions that are subsequent to a current instruction.

The following illustrates an example retrieving trackable instruction.

Reter.fin, (t1), IMax, SKIP_LABEL

When decoded, the above retrieving trackable instruction retrieves information related to the trackable variable t1 and copies the value to variable Imax in the above program and jumps to a location SKIP_LABEL address in the program. Thus, it will not decode the second for loop to compute the value of variable Imax by explicitly iterating over the array variable A.

The track variable cache 240 includes a field called flag bit, which indicates that there are some instructions related to the track variable which are present in the track instruction cache. If there is a track foreground trackable instruction using this variable, then the received instruction waits until the decoder 226 decodes the background trackable instruction in the track instruction cache 230.

The above described process assumes that there is sufficient amount of track instruction cache available for storing the track instructions and does not create an instruction overflow in the track instruction cache 230. In some embodiments, where there is a limited amount of track instruction cache available to store the track instructions, the system can be designed to operate such that the normal instruction execution can be halted until the track instructions are decoded so that new track instructions can be stored in the track instruction cache 230. In these embodiments, the background trackable instructions may be designed to be decoded almost immediately or later depending on the availability of the computer system resources. The later execution of the background trackable instructions can require storage space to store these instructions, and in these embodiments, they can be designed to store the background trackable instructions in the track instruction cache 230.

Figure 3:
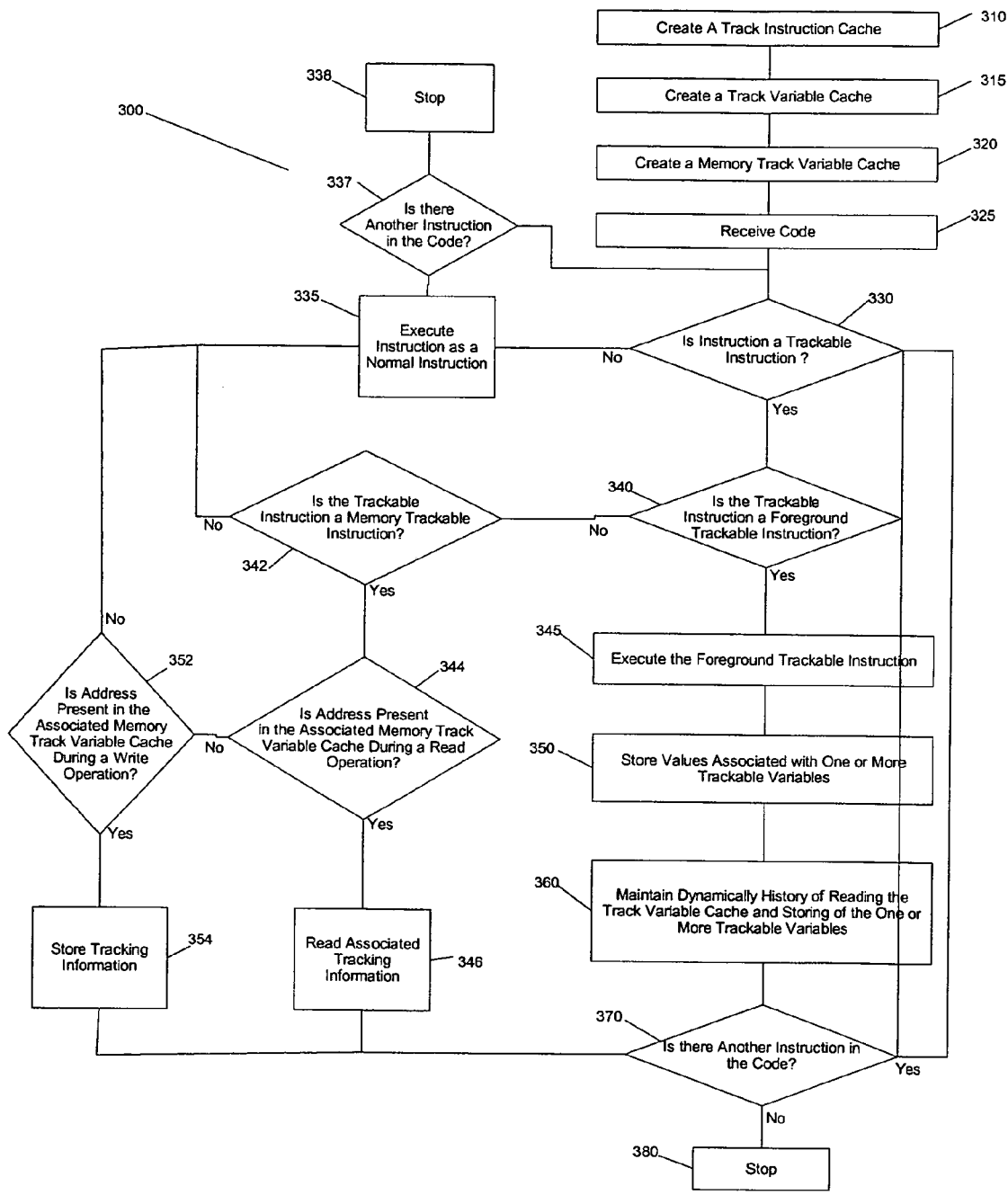
FIG. 3 is a flowchart illustrating an example method of performing run-time memory tracking according to an embodiment of the present invention.

FIG. 3 is a flowchart illustrating an example method 300 of performing run-time memory tracking. At 310, 315, and 320, the method 300 creates a track instruction cache, track variable cache, and a memory track variable cache, respectively. At 325, this example method 300 receives code from main memory for execution. The code can include one or more instructions in the executable computer program. In these embodiments, the one or more instructions can include normal instructions, trackable instructions, retrieving trackable instructions, and/or memory trackable instructions. The trackable instructions can include instructions, such as foreground trackable instructions and background trackable instructions. In these embodiments, an execution unit of a processor receives the one or more instructions sequentially for execution by a processor.

At 330, the method 300 checks whether the received instruction is a trackable instruction. Based on the determination at 330, the method 300 goes to step 335 if the received instruction is not a trackable instruction. At 335, the received instruction is decoded as a normal instruction. Based on the determination at 330, the method 300 goes to step 340 if the received instruction is a trackable instruction. At 340, the method 300 checks whether the received trackable instruction is a foreground trackable instruction. Based on the determination at 340, the method 300 goes to 345 if the received trackable instruction is a foreground trackable instruction.

At 340, the foreground trackable instruction is decoded as a normal instruction until an instruction associated with the one or more trackable variables are encountered. The instructions associated with the one or more trackable variables are then decoded by terminating the execution of the normal instruction, by performing a read operation on the track variable cache associated with the one or more trackable variables. The execution of the foreground trackable instruction is then completed.

In some embodiments, the method 300 checks whether any of the required resources in the received foreground trackable instruction are present in the track instruction cache. Based on the determination, the method 330 decodes the received foreground trackable instruction as a normal instruction if there are no required resources defining instructions that are present in the track instruction cache. Based on the determination, the method 300 decodes the resources as they are defined in the resources and decodes the foreground trackable instruction using the decoded resources as required by the foreground trackable instruction.

In some embodiments, this is achieved by inserting an instruction number into the track variable cache and setting a flag bit in the track variable cache corresponding to the resource that is being defined by the instruction. This is so that if any foreground/retrieving trackable instruction needs to be decoded upon verification of any other instructions need to be decoded before decoding the received foreground/retrieving trackable instruction as described above with reference to step 340.

At 350, values associated with the one or more trackable variables are stored in the track variable cache upon completion of the execution of the foreground trackable instruction. At 360, a history of the reading of the track variable cache and the storing of the values associated with the one or more trackable variables are dynamically maintained in the memory track variable cache.

At 370, the method 300 checks whether there is another instruction in the received code. Based on the determination at 370, the method 300 goes to step 380 if there are no other instructions that need to be decoded in the received code. At 380, the method 300 stops the code execution. Based on the determination at 370, the method 300 goes to step 330 and repeats steps 330-380, if there are other instructions in the received code that needs to be decoded.

Based on the determination at 340, the method 300 goes to step 342 if the received trackable instruction is not a foreground trackable instruction. At 342, the method 300 checks whether the received instruction is a memory trackable instruction. Based on the determination at 342, the method 300 goes to step 335 and decodes the received instruction as a normal instruction if the received instruction is not a memory trackable instruction.

Based on the determination at 342, the method 300 goes to step 344 if the received instruction is a memory trackable instruction. At 344, the method determines whether an address is present in the associated memory track variable cache during a read operation on the respective memory track variable cache. Based on the determination at 344, the method 300 goes to 346 and reads the associated tracking information requested by the memory trackable instruction, if the address is present in the associated memory track variable cache during the read operation on the memory track variable cache. Based on the determination at 344, the method 300 goes to step 352 if the address is not present in the associated memory track variable cache during a read operation on the memory track variable cache.

At 352, the method 300 determines whether an address is present in the associated memory track variable cache during a write operation on the associated memory track variable cache. Based on the determination at 352, the method 300 goes to step 335 and decodes the received memory trackable instruction as a normal instruction if the address is not present in the associated memory track variable cache during the write operation on the associated memory track variable cache. At 337, the method 300 determines whether there is another instruction in the received code. Based on the determination at 337, the method 300 goes to step 338 and stops the code execution, if there are no other instructions to be decoded in the received code. Based on the determination at 337, the method 300 goes to step 330 and repeats steps 330-380 if there is an instruction in the received code that needs to be decoded.

Based on the determination at 352, the method 300 goes to step 354 if the address is present in the associated memory track variable cache during the write operation on the associated memory track variable cache. At 354, the tracking information in the associated memory track variable cache requested by the memory trackable instruction is stored.

Figure 4:
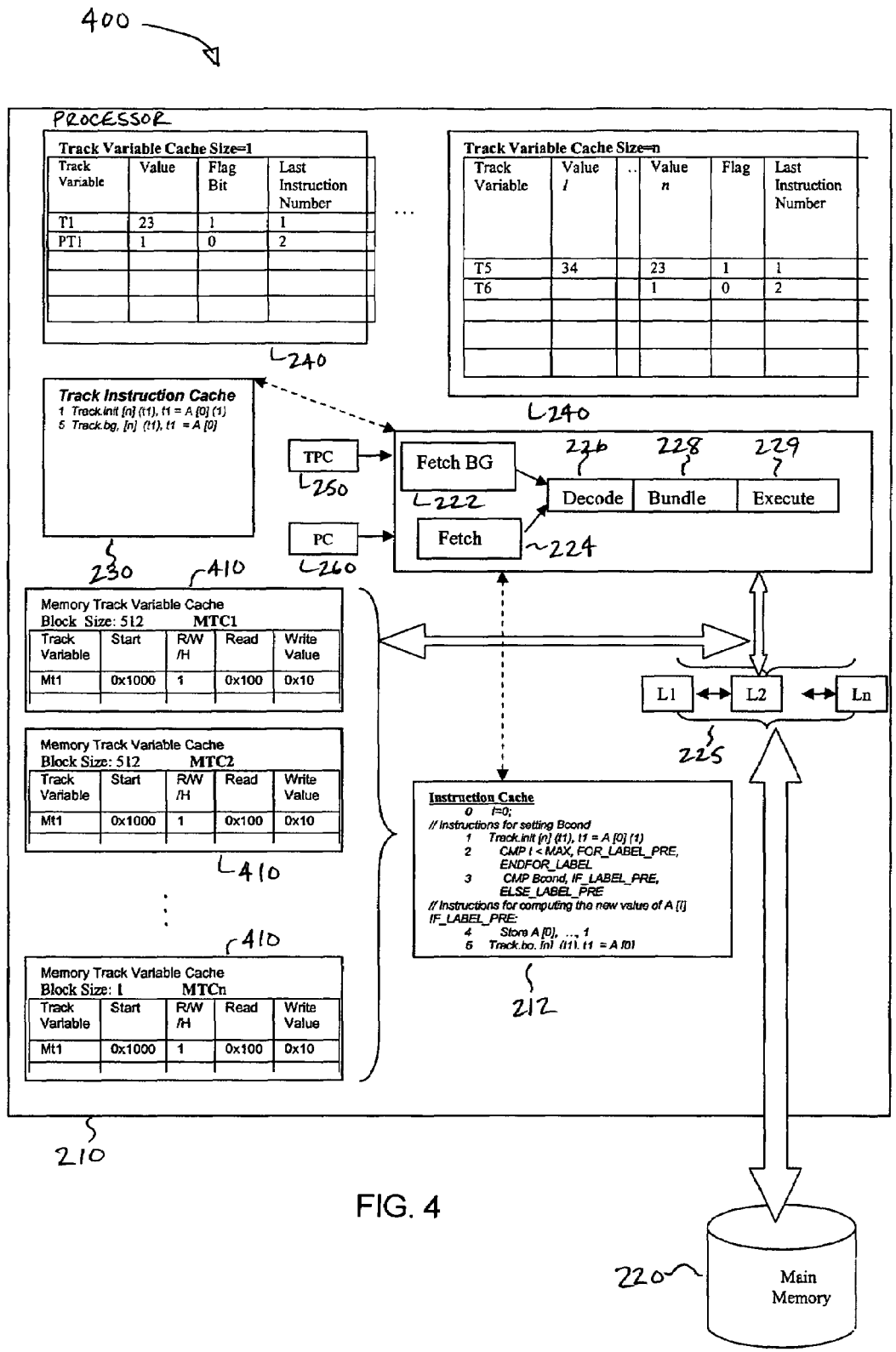
FIG. 4 is block diagram illustrating an example computer system to implement the method of performing the run-time memory tracking of FIG. 3.

Referring now to FIG. 4, there is illustrated a block diagram of an example computer system 400 for implementing the method for performing the run-time memory tracking of FIG. 3. The computer system 400 includes the processor 210 and the main memory 220. As shown in FIG. 4, the processor 210 includes track variable cache along with the track variable flag bit 240, one or more memory track variable caches L1, L2, ... Ln 225, the fetch unit 222, the fetch BG unit 224, the decode unit 226, the bundle module 228, and the decode module 229. Also shown in FIG. 4, are a program counter (PC) module 250 and a track instruction program counter (TPC) module 260.

In operation, the source code including normal and trackable instructions stored in the instruction cache 212 is fed sequentially into the processor 210 for decoding the code by the fetch units 222 and 224. During the decoding of the source code the computer system 200 uses the memory track variable cache 230 along with the track variable cache 240 to track the memory locations according to the present invention. The tracking of the memory locations is explained in more detail with reference to FIG. 3.

Although the flowcharts 100 and 200 include steps 110-172 and 310-380, respectively, that are arranged serially in the exemplary embodiments, other embodiments of the subject matter may decode two or more steps in parallel, using multiple processors or a single processor organized as two or more virtual machines or sub-processors. Moreover, still other embodiments may implement the steps as two or more specific interconnected hardware modules with related control and data signals communicated between and through the modules, or as portions of an application-specific integrated circuit. Thus, the exemplary process flow diagrams are applicable to software, firmware, and/or hardware implementations.

Various embodiments of the present invention can be implemented in software, which may be run in the environment shown in FIG. 5 (to be described below) or in any other suitable computing environment. The embodiments of the present invention are operable in a number of general-purpose or special-purpose computing environments. Some computing environments include personal computers, general-purpose computers, server computers, hand-held devices (including, but not limited to, telephones and personal digital assistants (PDAs) of all types), laptop devices, multi-processors, microprocessors, set-top boxes, programmable consumer electronics, network computers, minicomputers, mainframe computers, distributed computing environments and the like to decode code stored on a computer-readable medium. The embodiments of the present invention may be implemented in part or in whole as machine-executable instructions, such as program modules that are decoded by a computer. Generally, program modules include routines, programs, objects, components, data structures, and the like to perform particular tasks or to implement particular abstract data types. In a distributed computing environment, program modules may be located in local or remote storage devices.

Figure 5:
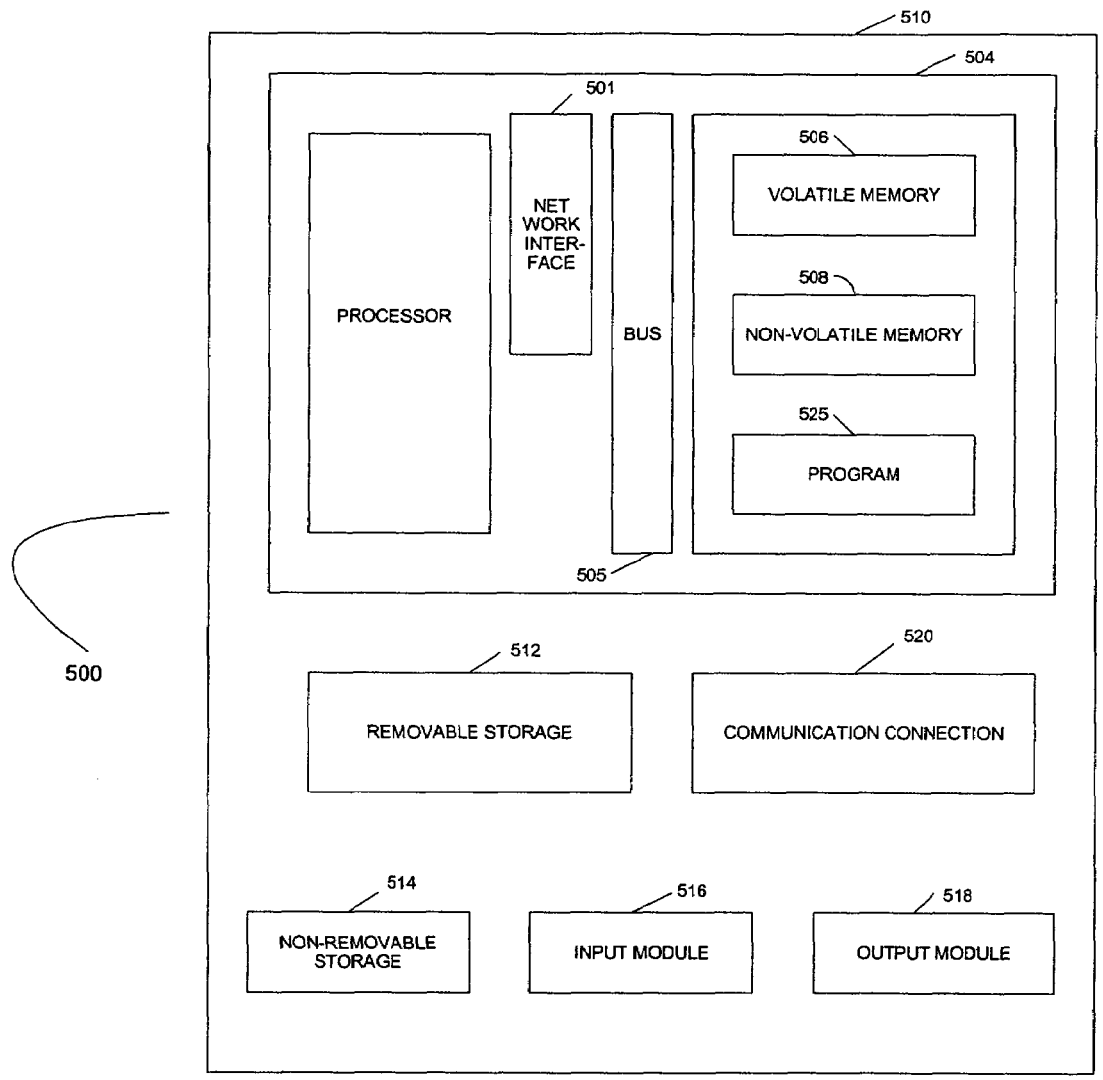
FIG. 5 is a block diagram of a typical computer system used for run-time value tracking during code execution according to various embodiments of the present invention, such as those shown in FIGS. 1-4.

FIG. 5 shows an example of a suitable computing system environment for implementing embodiments of the present invention. FIG. 5 and the following discussion are intended to provide a brief, general description of a suitable computing environment in which certain embodiments of the inventive concepts contained herein may be implemented.

A general computing device, in the form of a computer 510, may include a processor 502, memory 504, removable storage 512, and non-removable storage 514. Computer 510 additionally includes a bus 505 and a network interface (NI) 501. The processor 502 may include an encoder 530 and a comparator 540.

Computer 510 may include or have access to a computing environment that includes one or more input modules 516, one or more output modules 518, and one or more communication connections 520 such as a network interface card or a USB connection. The computer 510 may operate in a networked environment using the communication connection 520 to connect to one or more remote computers. A remote computer may include a personal computer, server, router, network PC, a peer device or other network node, and/or the like. The communication connection may include a Local Area Network (LAN), a Wide Area Network (WAN), and/or other networks.

The memory 504 may include volatile memory 506 and non-volatile memory 508. A variety of computer-readable media may be stored in and accessed from the memory elements of computer 510, such as volatile memory 506 and non-volatile memory 508, removable storage 512 and non-removable storage 514. Computer memory elements can include any suitable memory device(s) for storing data and machine-readable instructions, such as read only memory (ROM), random access memory (RAM), erasable programmable read only memory (EPROM), electrically erasable programmable read only memory (EEPROM), hard drive, removable media drive for handling compact disks (CDs), digital video disks (DVDs), diskettes, magnetic tape cartridges, memory cards, Memory Sticks™, and the like; chemical storage; biological storage; and other types of data storage.

"Processor" or "processing unit," as used herein, means any type of computational circuit, such as, but not limited to, a microprocessor, a microcontroller, a complex instruction set computing (CISC) microprocessor, a reduced instruction set computing (RISC) microprocessor, a very long instruction word (VLIW) microprocessor, explicitly parallel instruction computing (EPIC) microprocessor, a graphics processor, a digital signal processor, or any other type of processor or processing circuit. The term also includes embedded controllers, such as generic or programmable logic devices or arrays, application specific integrated circuits, single-chip computers, smart cards, and the like.

Embodiments of the present invention may be implemented in conjunction with program modules, including functions, procedures, data structures, application programs, etc., for performing tasks, or defining abstract data types or low-level hardware contexts.

Machine-readable instructions stored on any of the above-mentioned storage media are executable by the processor 502 of the computer 510. For example, a computer program 525 may comprise machine-readable instructions capable of performing a run-time value tracking during code execution according to the teachings and herein described embodiments of the present invention. In one embodiment, the computer program 525 may be included on a CD-ROM and loaded from the CD-ROM to a hard drive in non-volatile memory 508. The machine-readable instructions cause the computer 510 to perform run-time value tracking according to the various embodiments of the present invention.

The run-time value tracking technique of the present invention is modular and flexible in terms of usage in the form of a "Distributed Configurable Architecture". As a result, parts of the run-time tracking system may be placed at different points of a network, depending on the model chosen. For example, the technique can be deployed in a server and the input and output instructions streamed over from a client to the server and back, respectively. The encoder can also be placed on each client, with the database management centralized. Such flexibility allows faster deployment to provide a cost effective solution to changing business needs.

The above description is intended to be illustrative, and not restrictive. Many other embodiments will be apparent to those skilled in the art. The scope of the invention should therefore be determined by the appended claims, along with the full scope of equivalents to which such claims are entitled.

The above-described methods and apparatus provide various embodiments for encoding characters. It is to be understood that the above-description is intended to be illustrative, and not restrictive. Many other embodiments will be apparent to those of skill in the art upon reviewing the above-description. The scope of the subject matter should, therefore, be determined with reference to the following claims, along with the full scope of equivalents to which such claims are entitled.

As shown herein, the present invention can be implemented in a number of different embodiments, including various methods, a circuit, an I/O device, a system, and an article comprising a machine-accessible medium having associated instructions.

Other embodiments will be readily apparent to those of ordinary skill in the art. The elements, algorithms, and sequence of operations can all be varied to suit particular requirements. The operations described-above with respect to the method illustrated in FIG. 1 can be performed in a different order from those shown and described herein.

FIGS. 1, 2, 3, 4, and 5 are merely representational and are not drawn to scale. Certain proportions thereof may be exaggerated, while others may be minimized. FIGS. 1-5 illustrate various embodiments of the invention that can be understood and appropriately carried out by those of ordinary skill in the art.

It is emphasized that the Abstract is provided to comply with 37 C.F.R.§1.72(b) requiring an Abstract that will allow the reader to quickly ascertain the nature and gist of the technical disclosure. It is submitted with the understanding that it will not be used to interpret or limit the scope or meaning of the claims.

In the foregoing detailed description of the embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the detailed description of the embodiments of the invention, with each claim standing on its own as a separate preferred embodiment.

The invention claimed is:

1. A method for run-time tracking one or more variables during code execution in a computer comprising:

determining during the code execution that an instruction received is a trackable instruction, wherein the trackable instruction has one or more trackable variables;

if the instruction is a trackable instruction, then decoding the trackable instruction, wherein decoding the trackable instruction comprises:

determining if the trackable instruction is a background trackable instruction, wherein the background trackable instruction has one or more trackable variables, and if the trackable instruction is a background trackable instruction:

decoding the background trackable instruction including the one or more trackable variables; and updating a track instruction cache and a track variable cache associated with the decoded trackable instruction and the one or more trackable variables, respectively.

2. The method of claim 1, further comprising:
if the instruction is not a trackable instruction, then decoding the received instruction as a normal instruction.

3. The method of claim 1, wherein updating the track instruction cache and the track variable cache comprises:
storing the decoded background trackable instruction in the track instruction cache; and
setting each flag bit associated with the one or more trackable variables in the track variable cache to indicate a change in the one or more trackable variables.

4. The method of claim 3, further comprising:
if the trackable instruction is not a background trackable instruction, then determine if the trackable instruction is a foreground trackable instruction, wherein the foreground trackable instruction has one or more trackable variables;
if the trackable instruction is a foreground trackable instruction, then determining a change in status of each track variable flag bit associated with the one or more trackable variables in the foreground trackable instruction; and
decoding the foreground trackable instruction based on the change in status of each track variable flag bit associated with the one or more trackable variables in the foreground trackable instruction.

5. The method of claim 4, wherein decoding the foreground trackable instruction based on the status of each track variable flag bit associated with the one or more trackable variables comprises:
if the track variable flag bit associated with each of the one or more trackable variables in the foreground trackable instruction does not indicate a change in the status then decoding the foreground trackable instruction as a normal instruction; and
if the track variable flag bit associated with each of the one or more track variables in the foreground trackable instruction indicates a change in the status then decoding the one or more trackable instructions associated with the one or more trackable variables in the track instruction cache based on a last instruction number field associated with each track variable and decoding the foreground trackable instruction using the one or more trackable variables obtained by decoding the associated one or more trackable instructions, and updating associated one or more track variable flag bits in the track variable cache.

6. The method of claim 3, wherein setting each track variable flag bit associated with the one or more trackable variables comprises setting each memory space associated with the one or more trackable variables.

7. The method of claim 4, further comprising:
if the trackable instruction is not a foreground trackable instruction, then determining whether an instruction is a retrieving trackable instruction;
if the trackable instruction is a retrieving trackable instruction, then determining a status of each track variable flag bit associated with the one or more trackable variables and retrieving the associated one or more trackable variables from the track variable cache as a function of the determining of the status of each track variable flag bit associated with the one or more trackable variables; and
decoding the retrieving trackable instruction using the retrieved one or more trackable variables.

8. The method of claim 1, wherein updating the track instruction cache and track variable cache comprises storing values in a storage selected from the group consisting of main memory, track variable cache, and register.

9. The method of claim 1, wherein the trackable instruction comprises instruction selected from a group consisting of a variable trackable instruction and an array trackable instruction.

10. A method for run-time tracking of a memory location during code execution in a computer comprising:
creating a track instruction cache;
creating a track variable cache;
creating a memory track variable cache;
determining dynamically during code execution whether an instruction is a trackable instruction, wherein the trackable instruction has one or more trackable variables;
if the instruction is a trackable instruction, then determining dynamically whether the trackable instruction is a background trackable instruction, and if not, determining dynamically if the trackable instruction is a foreground trackable instruction, and if not, determining dynamically whether the trackable instruction is a retrieving trackable instruction;
if the trackable instruction is a foreground trackable instruction, then decoding the foreground trackable instruction as a normal instruction until an instruction associated with the one or more trackable variables are encountered, then decoding the instruction associated with the one or more trackable variables by stopping execution of the normal instruction by performing a read operation on the track variable cache associated with the one or more trackable variables and completing the execution of the foreground trackable instruction;
storing values associated with the one or more trackable variables in the track variable cache upon completion of the execution of the foreground trackable instruction; and
maintaining dynamically history of the reading of the track variable cache and the storing of the values associated with the one or more trackable variables in the memory track variable cache.

11. The method of claim 10, further comprising:
determining during the code execution that an instruction is a memory trackable instruction;
determining that an address is present in the associated memory track variable cache during a read operation on the memory track variable cache; and
if the address is present in the memory track variable cache, then reading associated tracking information requested by the memory trackable instruction.

12. The method of claim 10, further comprising determining during the code execution that an instruction is a memory trackable instruction;

determining that an address is present in the associated memory track variable cache during a write operation on the associated memory track variable cache; and if the address is present in the memory track variable cache, then storing tracking information in the associated memory track variable cache requested by the memory trackable instruction.

13. An article comprising:

a storage medium having instructions that, when decoded by a computing platform, result in execution of a method comprising:

determining during code execution that an instruction received is a trackable instruction, wherein the trackable instruction has one or more trackable variables;

if the instruction received is a trackable instruction, then decoding the trackable instruction, wherein decoding the trackable instruction comprises:

determining if the trackable instruction is a background trackable instruction, and if not, determining if the trackable instruction is a foreground trackable instruction, wherein background trackable instructions and foreground trackable instructions have one or more trackable variables;

if the trackable instruction is a background trackable instruction, then decoding the background trackable instruction including the one or more trackable variables; and updating a track instruction cache and a track variable cache with associated decoded trackable instruction and the one or more trackable variables, respectively.

14. The article of claim 13, wherein updating the track instruction cache and the track variable cache comprises:

storing the decoded background trackable instruction in the track instruction cache; and setting each flag bit associated with the one or more trackable variables in a track cache to indicate a change in the one or more trackable variables.

15. The article of claim 14, further comprising:

if the trackable instruction is a foreground trackable instruction, then determining a change in status of each track variable flag bit associated with the one or more trackable variables in the foreground trackable instruction; and decoding the foreground trackable instruction based on the status of each track variable flag bit associated with the one or more trackable variables in the foreground trackable instruction.

16. The article of claim 15, wherein decoding the foreground trackable instruction based on the status of each track variable flag bit associated with the one or more trackable variables comprises:

if the track variable flag bit associated with each of the one or more trackable variables in the foreground trackable instruction does not indicate a change in the status then decoding the foreground trackable instruction as a normal instruction; and if the track variable flag bit associated with each of the one or more track variables in the foreground trackable instruction indicates a change in the status then decoding the one or more trackable instructions associated with the one or more trackable variables in the track instruction cache based on a last instruction number field associated with each track variable and decoding the foreground trackable instruction using the one or more trackable variables obtained by decoding the associated one or more trackable instructions, and updating associated one or more track variable flag bits in the track variable cache.

17. The article of claim 13, further comprising:

determining whether an instruction is a retrieving trackable instruction;

if so, determining the status of each track variable flag bit associated with the one or more trackable variables and retrieving the associated one or more trackable variables from the track variable cache as a function of the determining of the status of each track variable flag bit associated with the one or more trackable variables; and decoding the retrieving trackable instruction using the retrieved one or more trackable variables.

18. An article comprising:

a storage medium having instructions that, when decoded by a computing platform, result in execution of a method comprising:

creating a track instruction cache;

creating a track variable cache;

creating a memory track variable cache;

determining dynamically during code execution whether an instruction is a trackable instruction, wherein the trackable instruction has one or more trackable variables;

if the instruction is a trackable instruction, then determining dynamically whether the trackable instruction is a foreground trackable instruction, and if not, determining dynamically if the trackable instruction is a memory trackable instruction;

if the trackable instruction is a foreground trackable instruction, then decoding the foreground trackable instruction as a normal instruction until an instruction associated with the one or more trackable variables are encountered, then decoding the instruction associated with the one or more trackable variables by stopping the execution of the normal instruction by performing a read operation on the track variable cache associated with the one or more trackable variables and completing the execution of the foreground trackable instruction;

storing values associated with the one or more trackable variables in the track variable cache upon completion of the execution of the foreground trackable instruction; and maintaining dynamically history of the reading of the track variable cache and the storing of the values associated with the one or more trackable variables in the memory track variable cache.

19. The article of claim 18, further comprising:

if the trackable instruction is a memory trackable instruction, then:

determining that an address is present in the memory tracking cache during a read operation on the memory tracking cache; and if the address is present in the memory tracking cache, then reading associated tracking information requested by the memory trackable instruction.

20. The article of claim 18, further comprising:

if the trackable instruction is a memory trackable instruction, then:

determining that an address is present in the memory tracking cache during a write operation on the memory tracking cache; and if the address is present in the memory tracking cache, then storing associated tracking information requested by the memory trackable instruction.

21. A computer system comprising:
a processor; and
a memory coupled to the processor, the memory having stored therein code which when decoded by the processor, the code causes the processor to perform a method comprising:
determining during code execution that an instruction received is a trackable instruction, wherein the trackable instruction has one or more trackable variables;
if the instruction received is a trackable instruction, then decoding the trackable instruction; and
updating a track instruction cache and a track variable cache with associated decoded trackable instruction and the one or more trackable variables, respectively;
wherein decoding the trackable instruction comprises:
determining if the trackable instruction is a background trackable instruction, wherein the background trackable instruction has one or more trackable variables, and if the trackable instruction is a background trackable instruction, then:
decoding the background trackable instruction including the one or more trackable variables; and
updating the track instruction cache and the track variable cache with the associated decoded background trackable instruction and the one or more trackable variables, respectively; or
if the trackable instruction is not a background trackable instruction, then determining if the trackable instruction is a foreground trackable instruction, wherein the foreground trackable instruction has one or more trackable variables, and if the trackable instruction is a foreground trackable instruction, then:
determining a change in status of each track variable flag bit associated with the one or more trackable variables in the foreground trackable instruction; and
decoding the foreground trackable instruction based on the change in status of each track variable flag bit associated with the one or more trackable variables in the foreground trackable instruction.

22. The system of claim 21, wherein the method further comprises:
if the instruction received is not a trackable instruction, then decoding the received instruction as a normal instruction.

* * * * *